(12) United States Patent
Mailloux

(10) Patent No.: US 6,642,447 B1
(45) Date of Patent: Nov. 4, 2003

(54) ELECTRICAL RECEPTACLE BOX

(76) Inventor: Marc F. Mailloux, 1562 Richmond Street, Windsor, Ontario (CA), N9A-4B2

(*) Notice: Subject to any disclaimer, the term of this patent is extended or adjusted under 35 U.S.C. 154(b) by 0 days.

(21) Appl. No.: 10/340,269

(22) Filed: Jan. 13, 2003

(51) Int. Cl.⁷ .................................................. H01J 5/00
(52) U.S. Cl. ........................ 174/50; 174/48; 174/17 R; 22/4.02; 361/600; 248/906; 439/535
(58) Field of Search ......................... 174/48, 50, 17 R, 174/58, 63, 65 R, 53, 60, 135; 220/3.2, 3.3, 3.6, 3.8, 4.02; 248/906; 439/535, 537; 361/600

(56) References Cited

U.S. PATENT DOCUMENTS

| | | |
|---|---|---|
| 2,415,602 A | 2/1947 | Monaco |
| 2,654,074 A | 9/1953 | Lancelot |
| 3,619,476 A | 11/1971 | Rasmussen |
| 3,858,161 A | 12/1974 | Champion et al. |
| 3,952,142 A | 4/1976 | Weiss |
| D343,825 S | 2/1994 | Enderby |
| 5,391,837 A | 2/1995 | Carey |
| 5,413,501 A * | 5/1995 | Munn .......................... 439/535 |
| 5,430,248 A | 7/1995 | Levy |
| 5,465,198 A | 11/1995 | Kellogg |
| 5,677,512 A | 10/1997 | Reiker |
| 5,761,038 A | 6/1998 | Tanaka |
| 6,005,188 A * | 12/1999 | Teichler et al. ................ 174/50 |
| 6,066,803 A * | 5/2000 | Hagarty ........................ 174/50 |
| 6,147,304 A * | 11/2000 | Doherty ........................ 174/48 |
| 6,159,033 A | 12/2000 | Oka |
| 6,307,154 B1 * | 10/2001 | Gretz ........................... 174/50 |
| 6,309,248 B1 * | 10/2001 | King ........................... 439/535 |
| 6,509,524 B1 * | 1/2003 | Gretz ........................... 174/50 |
| 6,518,500 B1 * | 2/2003 | Huang ......................... 174/50 |
| 6,527,135 B1 * | 3/2003 | Braun et al. ................ 220/4.02 |

* cited by examiner

Primary Examiner—Dhiru R Patel
(74) Attorney, Agent, or Firm—Donald R. Schoonover

(57) ABSTRACT

A box includes a thin profile and movable mounting units so it can be used in locations that may be too small for existing electrical receptacle boxes, such as in connection with finish work on an unfinished room, or the like.

3 Claims, 4 Drawing Sheets

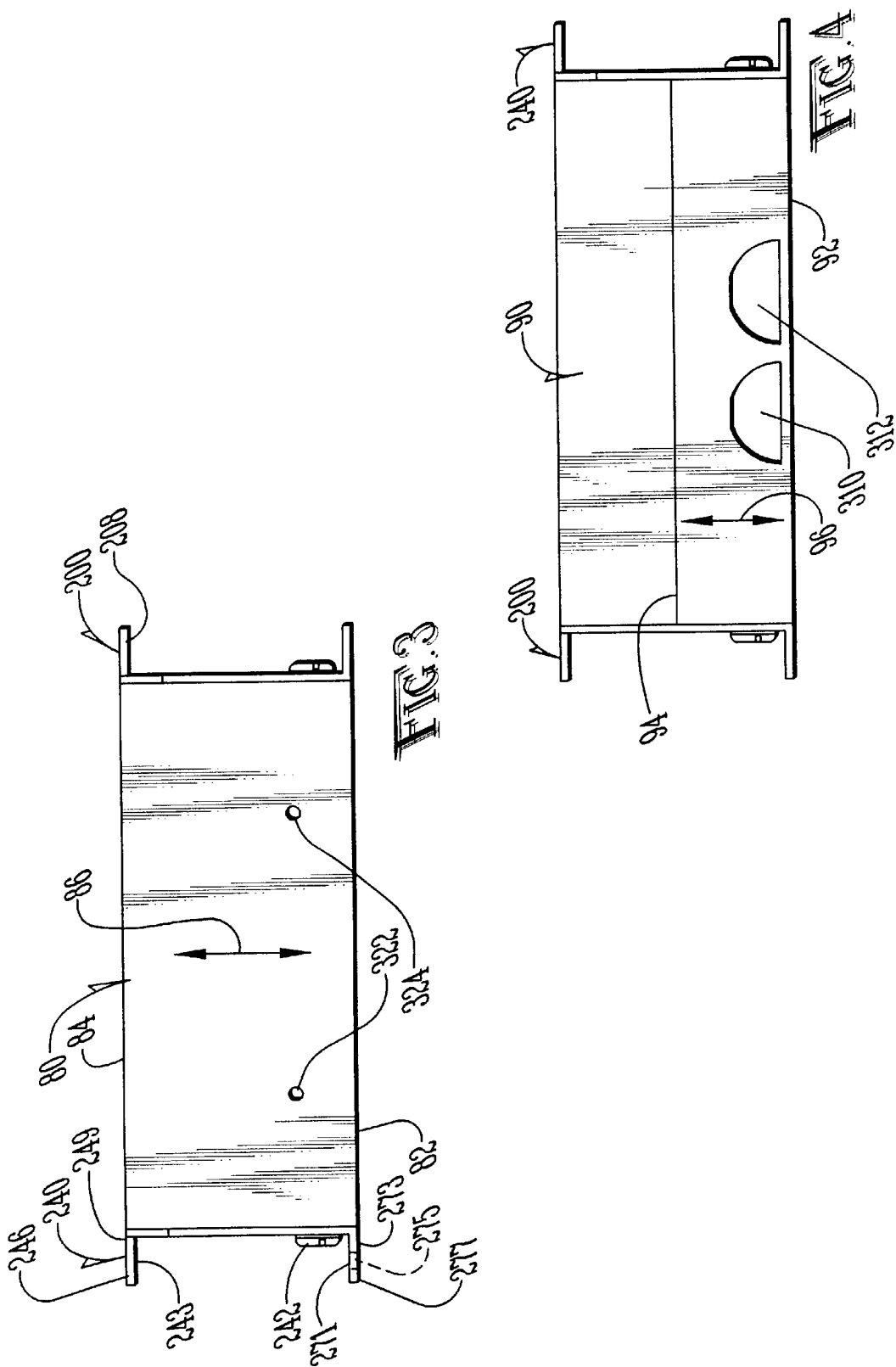

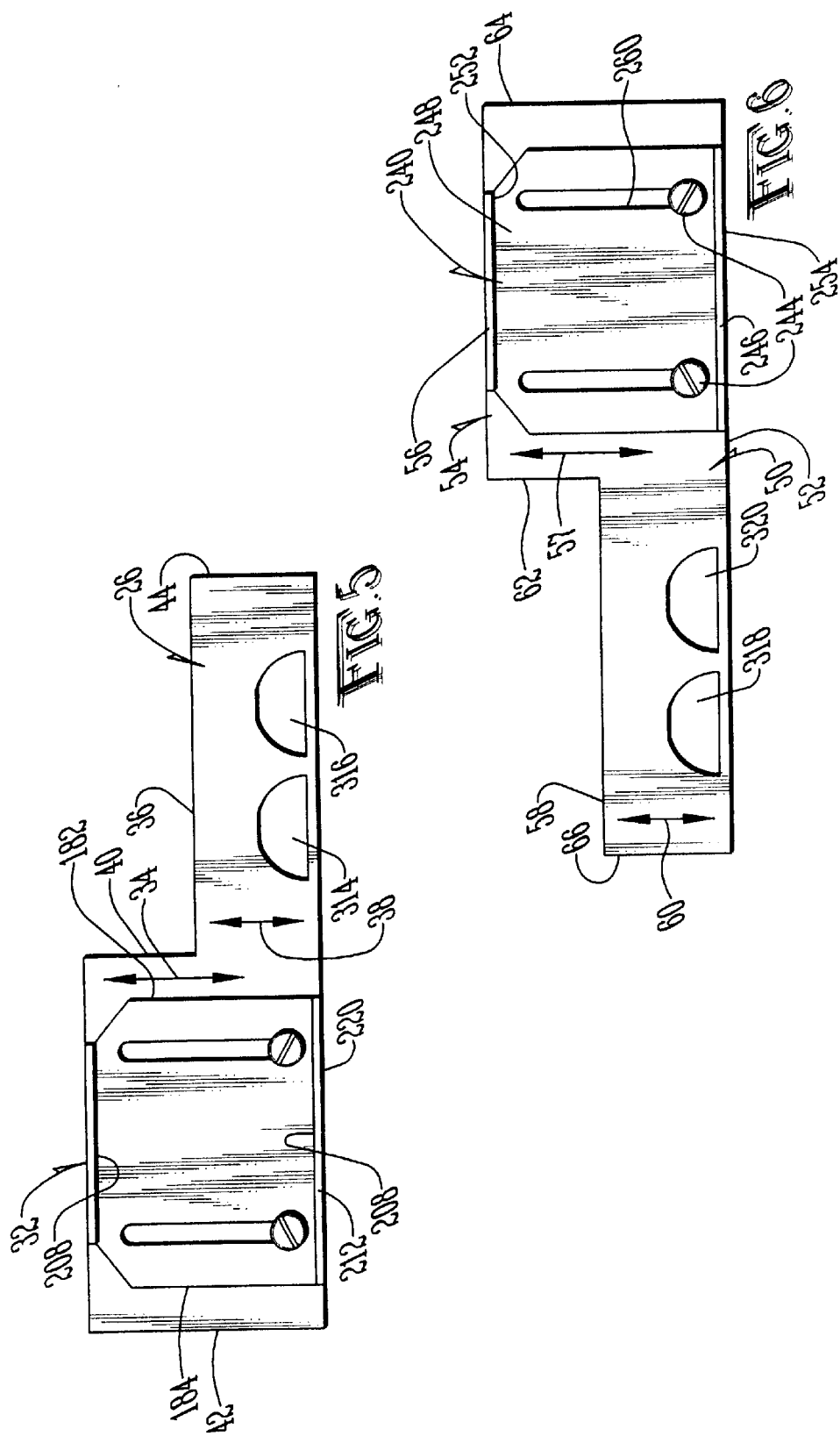

US 6,642,447 B1

ELECTRICAL RECEPTACLE BOX

BACKGROUND OF THE INVENTION

1. Field of the Invention

The present invention relates to the general art of static structures, and to the particular field of electrical equipment containment structures such as outlet boxes and switch boxes.

2. Discussion of the Related Art

One of the parts of finishing a basement or other incomplete section of a building that is particularly challenging and filled with its own set of trials is that of placing electrical outlets or electrical switches. Typically, as rooms are designed and built, accommodations are made for the placement of these units as part of the framing work. In this way, the finished product hides all connecting pieces and hardware. It also leaves a pleasing outer appearance that is desirable to the consumer. These accommodations are not generally accounted for in the construction of unfinished basements or unfinished rooms. In order to install electrical outlets and/or switch boxes, either more expensive framing work must be performed and/or holes must be cut into original walls. This can be time consuming and expensive.

Therefore, there is a need for a means to expeditiously place electrical outlet boxes and/or switches during a process of finishing an unfinished room.

PRINCIPAL OBJECTS OF THE INVENTION

It is a main object of the present invention to provide a means to expeditiously place electrical outlet boxes and/or switches during a process of finishing an unfinished room.

SUMMARY OF THE INVENTION

These, and other, objects are achieved by an electrical receptacle box comprising a body unit having side walls and end walls; two adjustable mounting units on the body unit; a plurality of wire ports defined through the side walls and end walls of the body unit; and a cover releasably attachable to the body unit. A side compartment is formed when a cover is mounted on the side walls of the body unit. The cover is L-shaped and has a portion that abuts shoulders formed on the top rims of the side walls when the cover is mounted in place.

The box embodying the present invention thus can be quite thin, yet will still accommodate the electrical equipment associated with outlet boxes and/or switch boxes. The box embodying the present invention can be used in connection with dry wall and the like and will save space, time and cost in adding drywall and the like to a room. The device embodying the present invention will minimize the amount of space needed when installing electrical equipment such as switches or outlets, or the like. The box of the present invention will replace larger receptacle boxes and will require less total surface area and volume. This will allow the consumer to choose less expensive framing materials and methods. Choosing these materials and installation procedures will reduce the total cost of finishing a room.

BRIEF DESCRIPTION OF THE DRAWING FIGURES

FIG. 3 is an end elevational view of the box shown in FIG. 1.

FIG. 4 is an end elevational view of the box shown in FIG. 1 showing the end opposite to the end shown in FIG. 3.

FIG. 5 is a side elevational view of the box shown in FIG. 1.

FIG. 6 is a side elevational view of the box shown in FIG. 1 showing the side opposite to the side shown in FIG. 5.

DETAILED DESCRIPTION OF THE PREFERRED EMBODIMENT

Figure 1:
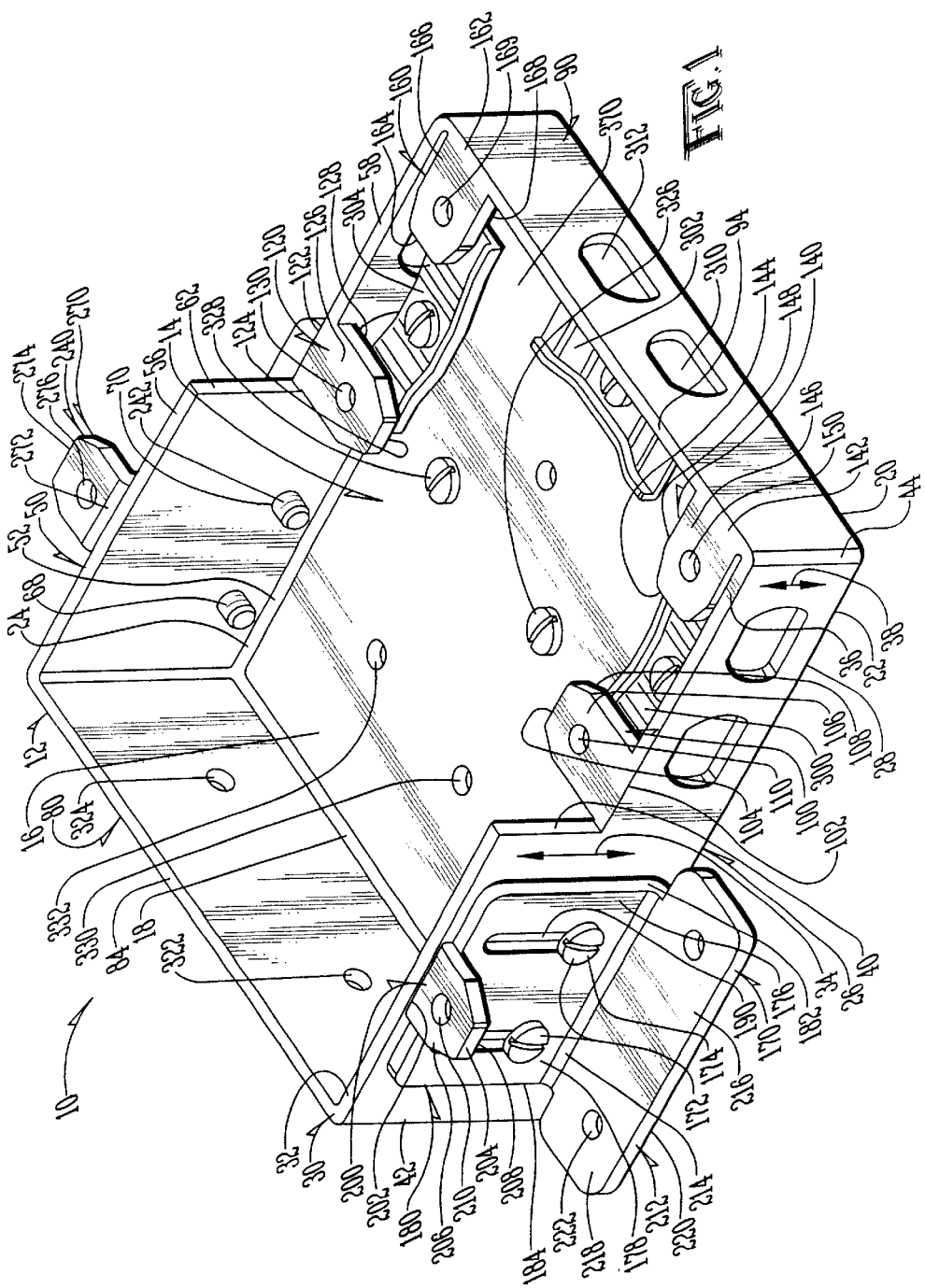
FIG. 1 is a perspective view of the electrical receptacle box embodying the present invention.
Figure 2:
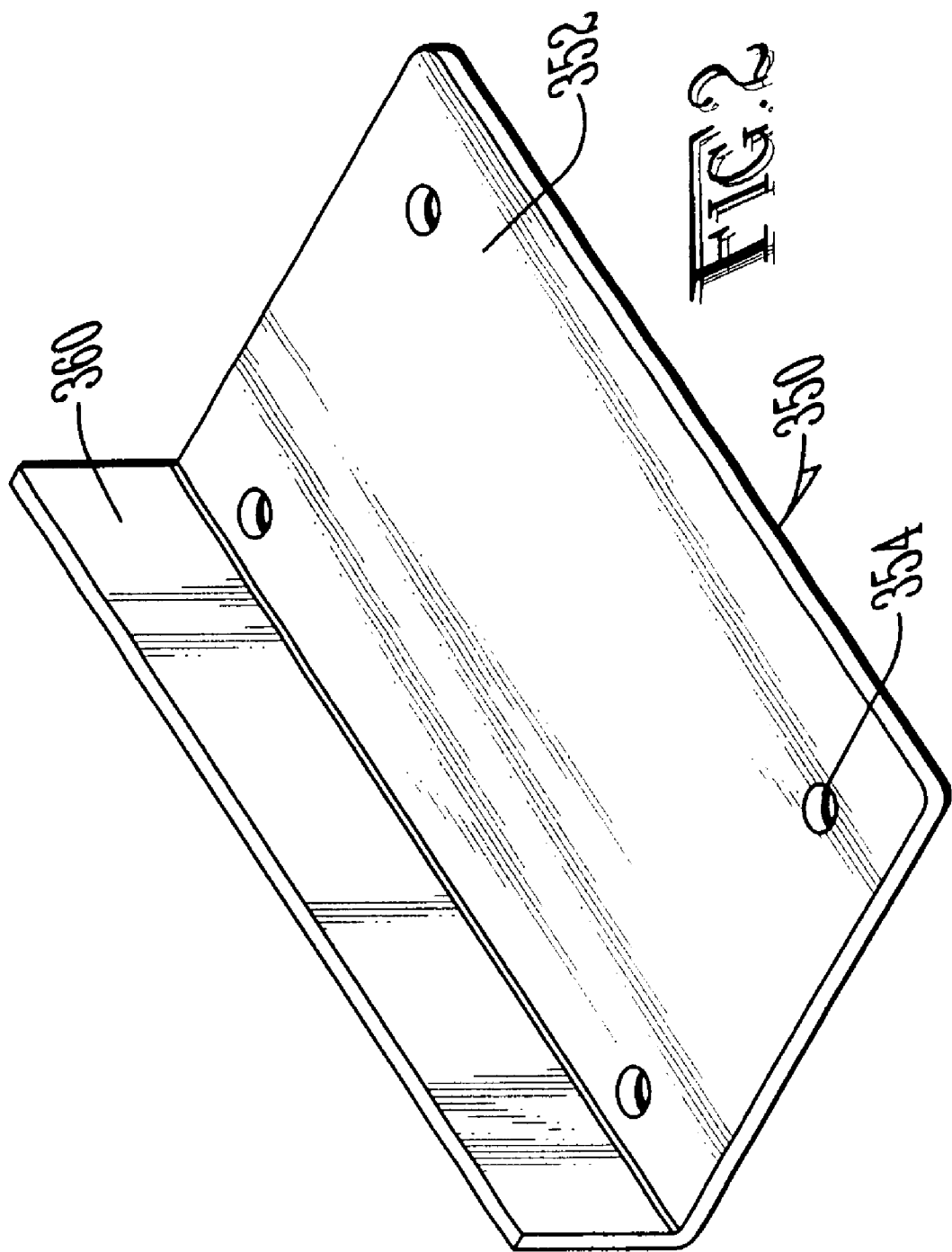
FIG. 2 is a perspective view of a cover that is used with the box shown in FIG. 1.

Other objects, features and advantages of the invention will become apparent from a consideration of the following detailed description and the accompanying drawings.

Referring to the figures, it can be understood that the present invention is embodied in an electrical receptacle box 10 that can be used to contain switches or electrical connections used in a room of a building. Electrical receptacle box 10 comprises a body unit 12, including a base 14 which includes a planar inner surface 16, a first end edge 18, a second end edge 20, a first side edge 22, and a second side edge 24.

Body unit 12 further includes a first side wall 26 which includes a first side edge 28 that is unitary with the first side edge 22 of the base 14, and a rim 30 spaced apart from the first side edge 28 of the first side wall 26. The rim 30 of the first side wall 26 has a first rim portion 32 spaced apart a first distance 34 from the first side edge 28 of the first side wall 26, a second rim portion 36 spaced apart a second distance 38 from the first side edge 28 of the first side wall 26, with second distance 38 of the first side wall 26 being less than first distance 34 of the first side wall 26. A shoulder portion 40 connects first rim portion 32 of the first side wall 26 to second rim portion 36 of the first side wall 26. The shoulder 40 of the first side wall 26 extends from the first rim portion 32 of the first side wall 26 toward the first side edge 22 of the base 14.

The first side wall 26 includes a third end edge 42 located adjacent to the first end edge 18 of the base 14 and a fourth end edge 44 located adjacent to the second end edge 20 of the base 14. The shoulder 40 of the first side wall 26 is located between the third end edge 42 of the first side wall 26 and the fourth end edge 44 of the first side wall 26.

Two spaced apart fastener receiving holes (not visible) are defined through the first side wall 26 adjacent to the first side edge 28 of the first side wall 26. The two spaced apart fastener receiving holes are located between the shoulder 40 of the first side wall 26 and the first end edge 18 of the base 14 and serve a purpose that will be understood from the teaching of the following disclosure.

Body 12 further includes a second side wall 50 which is also shown in FIG. 6 and which includes a first side edge 52 which is unitary with second side edge 24 of the base 14 and a rim 54 spaced apart From the first side edge 52 of the second side wall 50. The rim 54 of the second side wall 50 has a first rim portion 56 spaced apart a first distance 57 from the first side edge 52 of the second side wall 50, which is equal to first distance 34 of the first side wall 26 so the first rim portion 56 of the second side wall 50 is coplanar with the first rim portion 32 of the first side wall 26, and a second rim portion 58 spaced apart a second distance 60 from the first side edge 52 of the second side wall 50, which is equal to second distance 38 of the first side wall 26 so the second rim portion 58 of the second side wall 50 is coplanar with the second rim portion 36 of the first side wall 26. Second distance 60 of the second side wall 50 is less than the first distance 57 of the second side wall 50, and a shoulder portion 62 connects the first rim portion 56 of the second side wall 50 to the second rim portion 58 of the second side wall 50. Shoulder 62 of the second side wall 50 extends from the first rim portion 56 of the second side wall 50 toward the second side edge 24 of the base 14.

The second side wall 50 further includes a first end edge 64 located adjacent to the first end edge 18 of the base 14 and a second end edge 66 located adjacent to the second end edge 20 of the base 14.

Shoulder 62 of the second side wall 50 is located between the first end edge 64 of the second side wall 50 and the second end edge 66 of the second side wall 50.

Two spaced apart fastener receiving holes 68 and 70 are identical to the fastener receiving holes defined through the first side wall 26 and are defined through the second side wall 50 adjacent to the first side edge 52 of the second side wall 50. The two spaced apart fastener receiving holes 68, 70 are located between the shoulder 62 of the second side wall 50 and the first end edge 18 of the base 14.

Body 12 further includes a first end wall 80 shown in FIGS. 1 and 3. First end wall 80 has a first side edge 82 integral with the first end edge 18 of the base 14 and a rim 84 which is spaced apart from the first end edge 18 of the base 14 by a distance 86 which is equal to the first distance 34 of the first side wall 26 so rim 84 of the first end wall 80 is coplanar with first rim portion 32 of the first side wall 26.

Body 12 further includes a second end wall 90 which is shown in FIGS. 1 and 4. Second end wall 90 has a first side edge 92 integral with the second end edge 20 of the base 14 and a rim 94 which is spaced apart from the second end edge 20 of the base 14 by a distance 96 which is equal to second distance 38 of the first side wall 26 so the rim 94 of the second end wall 90 is coplanar with the second rim portion 36 of the first side wall 26.

Box 10 further includes a plurality of interior mounting ears. The interior mounting ears are used to mount a cover on the body 12 as will be understood from the teaching of the following disclosure.

The plurality of mounting ears includes a mounting ear 100 extending from the second rim portion 36 of the first side wall 26 of the body unit 12 adjacent to shoulder 40 of the first side wall 26 of the body unit 12. Mounting ear 100 includes a proximal end 102 integral with the second rim portion 36 of the first side wall 26 of the body unit 12 and a distal end 104 spaced from the proximal end 102 of the mounting ear 100 on the first side wall 26 of the body unit 12. A first surface 106 is oriented to be adjacent to the second rim portion 36 of the first side wall 26 of the body unit 12 and a second surface 108 is oriented to face inner surface 16 of the base 14. A fastener accommodating hole 110 is defined through mounting ear 100 on the second rim portion 36 of the first side wall 26 of the body unit 12 from first surface 106 of mounting ear 100 to second surface 108 of the mounting ear 100 on the second rim portion 36 of the first side wall 26 of the body unit 12.

A second mounting ear 120 extends from second rim portion 58 of the second side wall 50 of the body unit 12 adjacent to shoulder 62 of the second side wall 50 of the body unit 12. Second mounting ear 120 includes a proximal end 122 integral with second rim portion 58 of the second side wall 50 of the body unit 12 and a distal end 124 spaced from the proximal end 122 of second mounting ear 120 on the second side wall 50 of the body unit 12. Second mounting ear 120 further includes a first surface 126 located adjacent to second rim portion 58 of the second side wall 50 of the body unit 12 and a second surface 128 oriented to face inner surface 16 of the base 14 of the body unit 12. A fastener accommodating hole 130 is defined through second mounting ear 120 on the second rim portion 58 of the second side wall 50 of the body unit 12 from first surface 126 of second mounting ear 120 on the second rim portion 58 of the second side wall 50 of the body unit 12 to second surface 128 of second mounting ear 120.

A third mounting ear 140 extends from rim 94 of second end wall 90 of the body unit 12 adjacent to second rim portion 36 of the first side wall 26 of the body unit 12 and includes a proximal end 142 integral with the rim 94 of the second end wall 90 of the body unit 12 and a distal end 144 spaced from proximal end 142. A first surface 146 is located adjacent to rim 94 and a second surface 148 is oriented to face inner surface 16 of the base 14 of the body unit 12. A fastener accommodating hole 150 is defined through third mounting ear 140 from first surface 146 to second surface 148.

A fourth mounting ear 160 extends from rim 94 and is located adjacent to second rim portion 58 of the second side wall 50 of the body unit 12 and includes a proximal end 162 integral with rim 94 of the second end wall 90 of the body unit 12 and a distal end 164 spaced from proximal end 162 of fourth mounting ear 160 on the second end wall 40 of the body unit 12. A first surface 166 is located adjacent to rim 94 of the second end wall 90 of the body unit 12 and a second surface 168 is oriented to face inner surface 16 of the base 14 of the body unit 12. A fastener accommodating hole 169 is defined through fourth mounting ear 160 from first surface 166 of fourth mounting ear 160 to second surface 168 of fourth mounting ear 160.

First surface 146 of third mounting ear 140 is co-planar with first surface 166 of fourth mounting ear 160 and co-planar with first surface 122 of second mounting ear 120 on second rim portion 58 of second side wall 50 of the body unit 12. All of the first surfaces of the mounting ears just described are co-planar with each other.

A first adjustable mounting unit 170 is slidably mounted on first side wall 26 of the body unit 12. First adjustable mounting unit 170 includes two fasteners 172 received in the fastener receiving holes in the first side wall 26 of the body unit 12. Each fastener has a head, such as head 174 and a body which is externally threaded and extends through the fastener receiving holes defined through the side wall 26 of the body unit 12. The fasteners 172 are thus threadably mounted on the body unit 12 in the manner of a bolt.

A base portion 176 of the first adjustable mounting unit 170 has a first surface 178 and a second surface 180. Second surface 180 of the base portion 176 of the first adjustable mounting unit 170 slidably abuts the first side wall 26 of the body unit 12. The base portion 176 further includes a first side edge 182 and a second side edge 184 which is located adjacent to first side edge 22 of base 14 of body unit 12. First side edge 182 of the base portion 176 of the first adjustable mounting unit 170 is spaced apart from second side edge 184 of the base portion 176 of the first adjustable mounting unit 170.

Two elongated slots, such as elongated slot 190, are defined through base portion 176 of the first adjustable mounting unit 170 from the first surface 178 of the base portion 176 of the first adjustable mounting unit 170 to second surface 180 of the base portion 176 of the first adjustable mounting unit 170.

Each fastener of the two fasteners 172 extends through one of the two elongated slots 190 and the head 174 of each fastener 172 frictionally abuts the first surface 178 of the base portion 176 of the first adjustable mounting unit 170 adjacent to one of the two elongated slots 190 in the base portion 176 of the first adjustable mounting unit 170 to hold the mounting unit 170 in a desired position on the body unit 12.

A fifth mounting ear 200 extends from first side edge 180 of the base portion 176 of the first adjustable mounting unit 170 and includes a proximal end 202 integral with first side edge 180 of the base portion 176 of the first adjustable mounting unit 170 and a distal end 204 spaced from the proximal end 202 of fifth mounting ear 200. Fifth mounting ear 200 includes a first surface 206, a second surface 208, and a fastener accommodating hole 210 defined through fifth mounting ear 200 extending from first surface 206 of fifth mounting ear 200 to second surface 208 of mounting ear 200.

A mounting base plate 212 extends from second side edge 182 of the base portion 176 of the first adjustable mounting unit 170 and includes a proximal end 214 integral with the second side edge 184 of the base portion 176 of the first adjustable mounting unit 170 and a distal end 216 spaced from proximal end 214 of mounting base plate 212. A first surface 218 and a second surface 220 are located on the base plate 212. Two fastener accommodating holes, such as fastener accommodating hole 222, are defined through mounting base plate 212 of the first adjustable mounting unit 170 and extend from first surface 218 of mounting base plate 212 to second surface 220 of mounting base plate 212 of the first adjustable mounting unit 170.

Second surface 208 of mounting ear fifth 200 of the first adjustable mounting unit 170 is oriented parallel to first surface 218 of mounting base plate 212 of the first adjustable mounting unit 170.

First adjustable mounting unit 170 is movable with respect to the first side wall 26 of the body unit 12 between a position in which the mounting ear fifth 200 of the first adjustable mounting unit 170 is co-planar with first rim portion 32 of the first side wall 26 of the body unit 12, as shown in FIG. 1, to a position in which the mounting ear of the first adjustable mounting unit 170 is located between the first rim portion 32 of the first side wall 26 of the body unit 12 and the first side edge 22 of the body unit 12. Such movement allows the first adjustable mounting unit 170 to be moved to position the receptacle box 10 and the mounting thereof as necessary to accommodate the space and location selected for the receptacle box 10.

A second adjustable mounting unit 240 is located on second side wall 50 of the body unit 12. Second adjustable mounting unit 240 is identical to the aforedescribed first adjustable mounting unit 170 and is shown in FIGS. 1 and 6. Some reference numbers will be omitted from the Figures in the interest of clarity of the Figures. Second adjustable mounting unit 240 includes two fasteners, such as fastener 242, received in the fastener receiving holes 68, 70 in the second side wall 50 of the body unit 12. Each fastener 242 of second adjustable mounting unit 240 has a head 244. The second adjustable mounting unit 240 has a base portion 246 having a first surface 248 and a second surface 249, with the second surface 249 of the base portion 246 of the second adjustable mounting unit 240 slidably abutting the second side wall 50 of the body unit 12. Base portion 246 of the second adjustable mounting unit 240 further includes a first side edge 252 and a second side edge 254 with second side edge 254 being located adjacent to second side edge 24 of base 14 of the body unit 12. First side edge 252 of the base portion 246 of the second adjustable mounting unit 240 is spaced apart from the second side edge 254 of the base portion 246 of the second adjustable mounting unit 240.

Two elongated slots, such as elongated slot 260, are defined through base portion 246 of the second adjustable mounting unit 240 from first surface 248 of the base portion 246 of the second adjustable mounting unit 240 to the second surface 249 of the base portion 246 of the second adjustable mounting unit 240.

Each fastener of the two fasteners 242 of the second adjustable mounting unit 240 extends through one of the two elongated slots 260 of the second adjustable mounting unit 240 and head 244 of each fastener 242 of the second adjustable mounting unit 240 frictionally abuts the first surface 248 of the base portion 246 of the second adjustable mounting unit 240 adjacent to one of the two elongated slots 260.

A six mounting ear 270 extends from first side edge 252 of the base portion 246 of the second adjustable mounting unit 240 and includes a proximal end 272 integral with the first side edge 252 of the base portion 246 of the second adjustable mounting unit 240 and a distal end 274 spaced from the proximal end 272 of six mounting ear 270 of the base portion 246 of the second adjustable mounting unit 240, a first surface 241, a second surface 243, and a fastener accommodating hole 276 defined through six mounting ear 270 and extending from the first surface of six mounting ear 270 to the second surface of six mounting ear 270.

A mounting base plate 277 extends from the second side edge 254 of the base portion 246 of the second adjustable mounting unit 240 and includes a proximal end integral with the second side edge 254 of the base portion 246 of the second adjustable mounting unit 240, a distal end spaced from the proximal end of the mounting base plate 277 extending from the second side edge 254 of the base portion 246 of the second adjustable mounting unit 240, a first surface 271, a second surface 273, and two fastener accommodating holes 275 defined through the mounting base plate 277 of the second adjustable mounting unit 240 and extending from the first surface 271 of the mounting base plate 277 of the second adjustable mounting unit 240 to the second surface 273 of the mounting base plate 277 of the second adjustable mounting unit 240.

As in the case with the first adjustable mounting unit 170, the second surface 243 of the six mounting ear 270 of the second adjustable mounting unit 240 is parallel to the first surface 271 of the mounting base plate 277 of the second adjustable mounting unit 240, and the second adjustable mounting unit 240 is movable with respect to the second side wall 50 of the body unit 12 between apposition in which the six mounting ear 270 of the second adjustable mounting unit 240 is co-planar with the first rim portion 56 of the second side wall 50 of the body unit 12 to a position in which the six mounting ear 270 of the second adjustable mounting unit 240 is located between the first rim portion 56 of the second side wall 50 of the body unit 12 and the second side edge 24 of the base 14 of the body unit 12.

The receptacle box 10 further includes a plurality of braces 300, 302 and 304 attached to the body unit 12. As will be understood from the teaching of the present disclosure, these braces 300, 302, 304 serve to stabilize wires extending into and out of the receptacle box 10. The braces 300, 302, 304 can be adjusted to secure wires in place.

Two wire ports 310 and 312 are defined through second end wall 90 of the body unit 12.

Two wire ports 314 and 316 are defined through first side wall 26 of the body unit 12, and two wire ports 318 and 320 are defined through second side wall 50 of the body unit 12.

Two stud mount holes 322 and 324 are defined through first end wall 80 of the body unit 12 and two ground fasteners 326 and 328 extend through the base 14 of the body unit 12 and two mounting fastener accommodating holes 330 and 332 are defined through the base of the body unit 12.

An L-shaped cover 350 includes a base portion 352 which is sized and shaped to fit over the second rim portions 36 and 58 and includes a plurality of fastener receiving holes, such as fastener receiving hole 354. Fastener receiving holes 354 are located to be aligned with fastener receiving holes 110, 130, 150 and 169 so fasteners extending through such aligned holes will fasten cover 350 to body unit 12. Cover 350 further includes a lip portion 360 which abuts shoulders 40 and 62 when the cover 350 is in place on the body unit 12. The cover 350 and the box covered thereby can be viewed as a side compartment 370 formed by the side walls 26, 50 of the body unit 12, the base 14 of the body unit 12, the second end wall 90 of the body unit 12 and the cover 350. The receptacle box 10 can be formed of any suitable materials, such as metal, plastic, or the like.

As will be understood from the foregoing, the receptacle box can be quite thin, i.e., dimensions 34 and 58 can be as small as one inch so the receptacle box 10 can be positioned in very small spaces. In fact, the receptacle box 10 of the present invention can be used behind a wall no less than ½ inch in depth and by using the adjustable mounting units 170, 240, the receptacle box 10 can be used in connection with walls having a depth of 1¾ inches. The adjustable mounting units 170, 240 are moved as necessary to securely mount the receptacle box 10 in place. Wires extend into and out of the receptacle box 10 via the wire ports 310–320 and the box 10 can be mounted and grounded as necessary. The receptacle box 10 can be mounted to cement walls as well as to studs and provides a compartment for electrical connections. The receptacle box of the present invention can be used on walls, ceilings and/or floors made of wood or cement, or the like.

It is understood that while certain forms of the present invention have been illustrated and described herein, it is not to be limited to the specific forms or arrangements of parts described and shown.

What is claimed and desired to be covered by Letters Patent is:

1. An electrical receptacle box comprising:
   a) a body unit which includes
      (1) a base which includes
         (A) a planar inner surface,
         (B) a first end edge,
         (C) a second end edge,
         (D) a first side edge, and
         (E) a second side edge,
      (2) a first side wall which includes
         (A) a first side edge which is unitary with the first side edge of the base,
         (B) a rim spaced apart from the first side edge of the first side wall, the rim of the first side wall having a first rim portion spaced apart a first distance from the first side edge of the first side wall, a second rim portion spaced apart a second distance from the first side edge of the first side wall, with the second distance of the first side wall being less than the first distance of the first side wall, and a shoulder portion connecting the first rim portion of the first side wall to the second rim portion of the first side wall, the shoulder of the first side wall extending from the first rim portion of the first side wall toward the first side edge of the base,
         (C) a third end edge located adjacent to the first end edge of the base,
         (D) a fourth end edge located adjacent to the second end edge of the base,
         (E) the shoulder of the first side wall being located between the third end edge of the first side wall and the fourth end edge of the first side wall, and
         (F) two spaced apart fastener receiving holes defined through the first side wall adjacent to the first side edge of the first side wall, the two spaced apart fastener receiving holes being located between the shoulder of the first side wall and the first end edge of the base,
      (3) a second side wall which includes
         (A) a first side edge which is unitary with the second side edge of the base,
         (B) a rim spaced apart from the first side edge of the second side wall, the rim of the first side wall having a first rim portion spaced apart a first distance from the first side edge of the second side wall which is equal to the first distance of the first side wall so the first rim portion of the second side wall is coplanar with the first rim portion of the first side wall, a second rim portion spaced apart a second distance from the first side edge of the second side wall which is equal to the second distance of the first side wall so the second rim portion of the second side wall is coplanar with the second rim portion of the first side wall, with the second distance of the second side wall being less than the first distance of the second side wall, and a shoulder portion connecting the first rim portion of the second side wall to the second rim portion of the second side wall, the shoulder of the second side wall extending from the first rim portion of the second side wall toward the second side edge of the base,
         (C) a first end edge located adjacent to the first end edge of the base,
         (D) a second end edge located adjacent to the second end edge of the base,
         (E) the shoulder of the second side wall being located between the first end edge of the second side wall and the second end edge of the second side wall, and
         (F) two spaced apart fastener receiving holes defined through the second side wall adjacent to the first side edge of the second side wall, the two spaced apart fastener receiving holes being located between the shoulder of the second side wall and the first end edge of the base, and
      (4) a first end wall having
         (A) a first side edge integral with the first end edge of the base, and
         (B) a rim which is spaced apart from the first end edge of the base by a distance which is equal to the first distance of the first side wall so the rim of the first end wall is coplanar with the first rim portion of the first side wall,
      (5) a second end wall having
         (A) a first side edge integral with the second end edge of the base, and
         (B) a rim which is spaced apart from the second end edge of the base by a distance which is equal to the second distance of the first side wall so the rim of the second end wall is coplanar with the second rim portion of the first side wall;

(6) a plurality of interior mounting ears, including
  (A) a first mounting ear extending from the second rim portion of the first side wall of said body unit adjacent to the shoulder of the first side wall of said body unit and including a proximal end integral with the second rim portion of the first side wall of said body unit, a distal end spaced from the proximal end of the mounting ear on the first Bide wall of said body unit, a first surface adjacent to the second rim portion of the first side wall of said body unit, a second surface facing the inner surface of the base, and a fastener accommodating hole defined through the first mounting ear,
  (B) a second mounting ear extending from the second rim portion of the second side wall of said body unit adjacent to the shoulder of the second side wall of said body unit and including a proximal end integral with the second rim portion of the second side wall of said body unit, a distal end spaced from the proximal end of the second mounting ear on the second side wall of said body unit, a first surface adjacent to the second rim portion of the second side wall of said body unit, a second surface facing the inner surface of the base of said body unit, and a fastener accommodating hole defined through the second mounting ear,
  (C) a third mounting ear extending from the rim of the second end wall of said body unit adjacent to the second rim portion of the first side wall of said body unit and including a proximal end integral with the rim of the second end wall of said body unit, a distal end spaced from the proximal end of the third mounting ear on the second end wall of said body unit, a first surface adjacent to the rim of the second end wall of said body unit, a second surface facing the inner surface of the base of said body unit, and a fastener accommodating hole defined through the third mounting ear on the rim of the second end wall of said body unit,
  (D) a fourth mounting ear extending from the rim of the second end wall of said body unit adjacent to the second rim portion of the second side wall of said body unit and including a proximal end integral with the rim of the second end wall of said body unit, a distal end spaced from the proximal end of the fourth mounting ear on the second end wall of said body unit, a first surface adjacent to the rim of the second end wall of said body unit, a second surface facing the inner surface of the base of said body unit, and a fastener accommodating hole defined through the fourth mounting ear on the rim of the second end wall of said body unit, and
  (E) the first surface of the third mounting ear being co-planar with the first surface of the fourth mounting ear and co-planar with the second rim portion of the second side wall of said body unit;
b) a first adjustable mounting unit on the first side wall of said body unit, said first adjustable mounting unit including
  (1) two fasteners received in the fastener receiving holes in the first side wall of said body unit, each fastener having a head,
  (2) a base portion having a first surface and a second surface, with the second surface of the base portion of the first adjustable mounting unit slidably abutting the first side wall of said body unit, the base portion further including a first side edge and a second side edge located adjacent to the first side edge of the base of said body unit, the first side edge of the base portion of the first adjustable mounting unit being spaced apart from the second side edge of the base portion of the first adjustable mounting unit,
  (3) two elongated slots defined through the base portion of the first adjustable mounting unit from the first surface of the base portion of the first adjustable mounting unit to the second surface of the base portion of the first adjustable mounting unit,
  (4) each of said fasteners of said first adjustable mounting unit extending through one of the two elongated slots of said first adjustable mounting unit and the head of each of said fasteners frictionally abutting the first surface of the base portion of the first adjustable mounting unit,
  (5) a fifth mounting ear extending from the first side edge of the base portion of the first adjustable mounting unit and including a proximal end integral with the first side edge of the base portion of the first adjustable mounting unit, a distal end spaced from the proximal end of the fifth mounting ear, a first surface, a second surface, and a fastener accommodating hole defined through the fifth mounting ear,
  (6) a mounting base plate extending from the first side edge of the base portion of the first adjustable mounting unit and including a proximal end integral with the second side edge of the base portion of the first adjustable mounting unit, a distal end spaced from the proximal end of the mounting base plate extending from the second side edge of the base portion of the first adjustable mounting unit, a first surface, a second surface, and two fastener accommodating holes defined tnrough the mounting base plate of the first adjustable mounting unit,
  (7) the second surface of the fifth mounting ear of the first adjustable mounting unit being parallel to the first surface of the mounting base plate of the first adjustable mounting unit, and
  (8) the first adjustable mounting unit being movable with respect to the first side wall of said body unit between a position in which the fifth mounting ear of the first adjustable mounting unit is co-planar with the first rim portion of the first side wall of said body unit to a position in which the fifth mounting ear of the first adjustable mounting unit is located between the first rim portion of the first side wall of said body unit and the first side edge of the base of said body unit;
c) a second adjustable mounting unit on the second side wall of said body unit, said second adjustable mounting unit including
  (1) two fasteners received in the fastener receiving holes in the second side wall of said body unit, each fastener of said second adjustable mounting unit having a head,
  (2) a base portion having a first surface and a second surface, with the second surface of the base portion of the second adjustable mounting unit slidably abutting the second side wall of said body unit, the base portion of said second adjustable mounting unit further including a first side edge and a second side edge located adjacent to the second side edge of the base of said body unit, the first side edge of the base portion of the second adjustable mounting unit being spaced apart from the second side edge of the base portion of the second adjustable mounting unit, (3) two elongated slots defined through the base portion of the second adjustable mounting unit from the first surface of the base portion of the second adjustable mounting unit to the second surface of the base portion of the second adjustable mounting unit, (4) each of said fasteners of said second adjustable mounting unit extending through one of the two elongated slots of said second adjustable mounting unit and the head of each of said fasteners of said second adjustable mounting unit frictionally abutting the first surface of the base portion of the second adjustable mounting unit adjacent to one of the two elongated slots in the base portion of the second adjustable mounting unit, (5) a sixth mounting ear extending from the first side edge of the base portion of the second adjustable mounting unit and including a proximal end integral with the first side edge of the base portion of the second adjustable mounting unit, a distal end spaced from the proximal end of the sixth mounting ear, a first surface, a second surface, and a fastener accommodating hole defined through the sixth mounting ear, (6) a mounting base plate extending from the second side edge of the base portion of the second adjustable mounting unit and including a proximal end integral with the second side edge of the base portion of the second adjustable mounting unit, a distal end spaced from the proximal end of the mounting base plate extending from the second side edge of the base portion of the second adjustable mounting unit, a first surface, a second surface, and two fastener accommodating holes defined through the mounting base plate of the second adjustable mounting unit, (7) the second surface of the sixth mounting ear of the second adjustable mounting unit being parallel to the first surface of the mounting base plate of the second adjustable mounting unit, and (8) the second adjustable mounting unit being movable with respect to the second side wall of said body unit between a position in which the sixth mounting ear of the second adjustable mounting unit is co-planar with the first rim portion of the second side wall of sand body unit to a position in which the sixth mounting ear of the second adjustable mounting unit is located between the first rim portion of the second side wall of said body unit and the second side edge of the base of said body unit;

d) a plurality of braces attached to said body unit;

e) two wire ports defined through the second end wall of said body unit;

f) two wire ports defined through the first side wall of said body unit;

g) two wire ports defined through the second side wall of said body unit;

h) two stud mount holes defined through the first end wall of said body unit;

i) two ground fasteners extending through the base of said body unit; and j) two mounting fastener accommodating holes defined through the base of said body unit.

2. The electrical receptacle box as described in claim 1 further including an L-shaped cover.

3. The electrical receptacle box as described in claim 2 further including a plurality of fastener accommodating holes defined through said L-shaped cover.

* * * * *